Sept. 15, 1959 R. J. EMINGER 2,904,269
COIL WINDING APPARATUS
Filed May 6, 1955 7 Sheets-Sheet 2

INVENTOR.
ROBERT J. EMINGER.
BY
LOCKWOOD, GALT, WOODARD & SMITH.
ATTORNEYS.

Fig. 5.

Sept. 15, 1959      R. J. EMINGER      2,904,269
COIL WINDING APPARATUS Filed May 6, 1955      7 Sheets-Sheet 5

INVENTOR.
ROBERT J. EMINGER.
BY
LOCKWOOD, GALT, WOODARD & SMITH.
ATTORNEYS.

Sept. 15, 1959     R. J. EMINGER     2,904,269
COIL WINDING APPARATUS
Filed May 6, 1955     7 Sheets-Sheet 6

INVENTOR.
ROBERT J. EMINGER.
BY
LOCKWOOD, GALT, WOODARD & SMITH.
ATTORNEYS.

Fig.9.

United States Patent Office 2,904,269
Patented Sept. 15, 1959

2,904,269

COIL WINDING APPARATUS

Robert J. Eminger, Kendallville, Ind., assignor to Fort Wayne Tool Die & Engineering Company, Fort Wayne, Ind., a company of Indiana Application May 6, 1955, Serial No. 506,617

3 Claims. (Cl. 242—1.1)

This invention is directed to a coil winding apparatus, and more specifically to a machine for automatically winding coils of wire in sequence on multi-pole stators for electric motors.

In winding coils of wire on stators, it is of paramount importance to obtain a high rate of speed in winding the required number of turns on respective poles of a multi-pole stator. On the other hand, it is of equal importance to prevent wire breakage, since the coils are connected in series, and snapping the wire results in breaking the series circuit.

One of the foremost objects of the invention is to provide an apparatus which is capable of automatically and sequentially winding multi-pole stators in alternating directions on adjacent poles.

A further object of the invention is to simultaneously wind two or more coils in a set, and then index the apparatus with simultaneous winding of the next set of poles in an opposite direction, this process being repeated until the stator is completely wound, whereupon the apparatus is automatically stopped.

A very significant feature of this invention is that of pulling additional wire out of the winding element when the element moves to a successive winding position. The purpose of the foregoing is to obtain a looped segment of wire connecting adjacent coils which is neither stretched nor located where it is likely to snag on any moving elements of the winding apparatus.

One of the results of this last mentioned feature is that the wire conductor is less susceptible to breakage, and therefore drastically reduces the number of stators which must be rejected or discarded.

Another outstanding feature of the invention is the comparative ease with which the machine is operated: It is only necessary to insert unwound stators, and remove completely wound stators. The apparatus functions fully automatically in winding the required number of poles at a rate which can be varied according to service requirements and design.

It will be understood that the number of turns per pole as well as provision for different numbers of poles can be controlled by suitable apparatus adjustment and arrangement.

These objects and others will become apparent from a consideration of the following description of an example embodiment taken in conjunction with the accompanying drawings, wherein:

Figure 1:
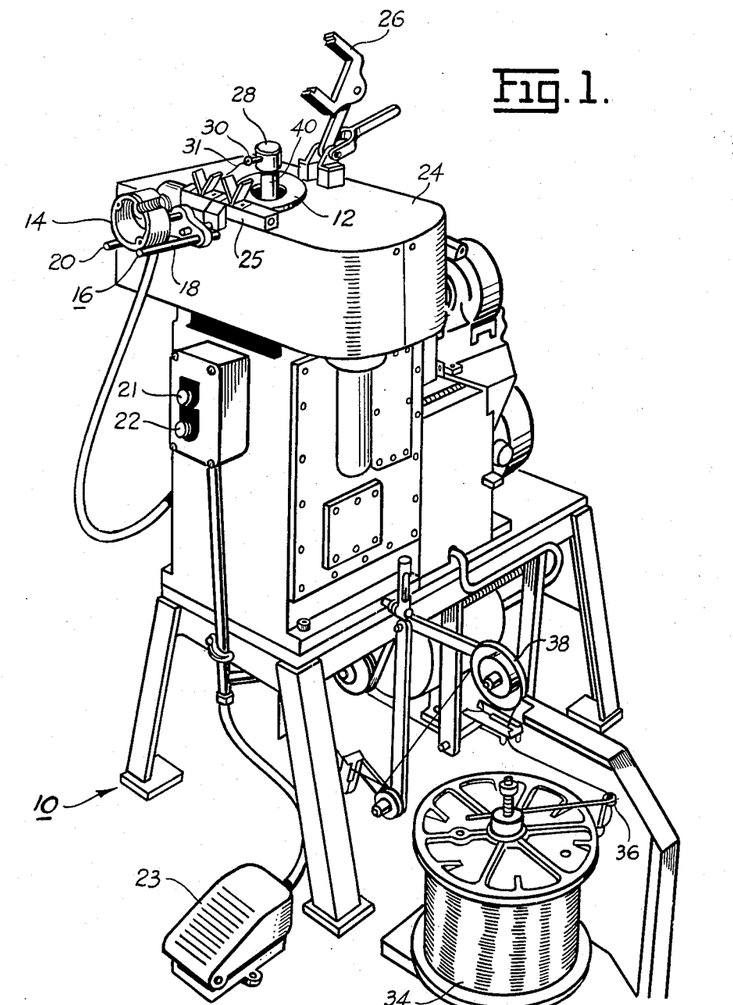
Fig. 1 is a perspective view of the coil winding apparatus.

Referring to Fig. 1, the coil winding apparatus 10 is shown generally. At the top of the winding apparatus is an elevatable winding nest 12 wherein an unwound stator is placed and processed. When the winding process is completed, the nest and wound stator are raised, then lowered, to obtain sufficient lead wire permitting the wound stator 14 to be placed in a receiving nest 16. The receiving nest consists essentially of two laterally extending bars 18 and 20.

The number of controls which the operator must apply has been reduced to a minimum. A starting button 21 is pressed to initiate the winding operation, a second switch 22 is provided for emergency stopping purposes. If switch 22 is pressed the winding process is interrupted regardless of the stage of stator winding. A third control 23 is operated by foot to elevate the winding nest at the end of the operation.

Wire, trailing from the wound stator, is drawn across a wire-cutting device 25 which may be actuated while a succeeding stator is being processed. Details of this part of the machine are fully explained in co-pending application Ser. No. 479,269, entitled "Coil Winding Apparatus," inventor John F. Lill. This application is incorporated herein so that reference may be made thereto for full explanation of certain features of the present invention.

The upper portion of the apparatus has a nonrotatable platform 24 and a hinged clamp or clamping means 26 which is swung back after each stator winding. The clamping means is brought down on the stator 27 (Fig. 5) to hold it in place while it is being wound.

Figure 7:
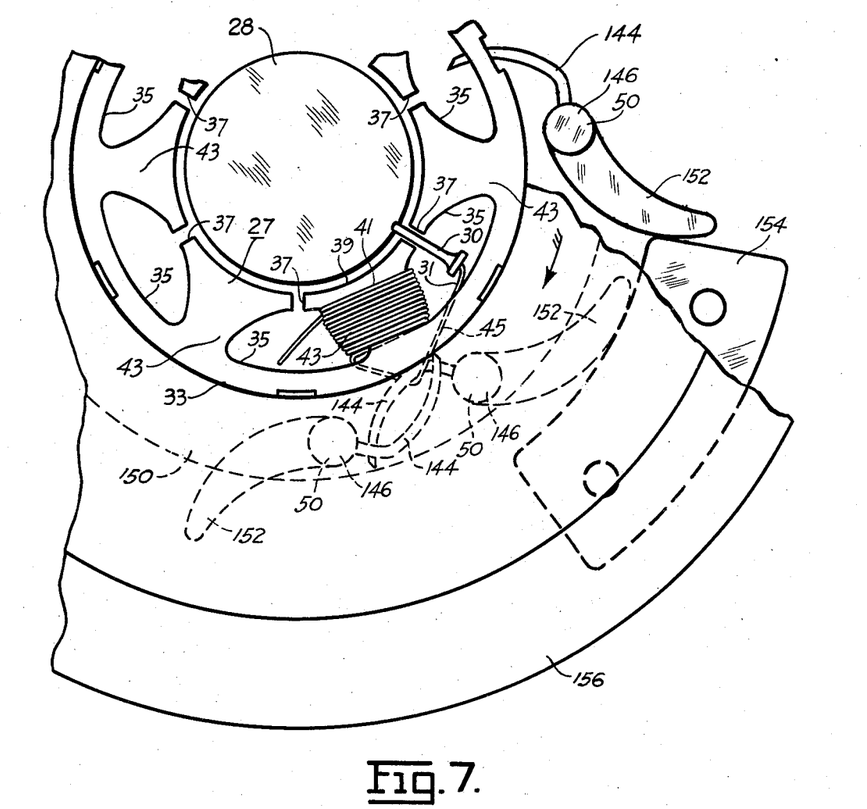
Fig. 7 is a composite progressive view showing fragmentarily, the top of a six (6) pole stator with successive indexing and loop-pulling stages as the stator indexes to a new position.
Figure 8:
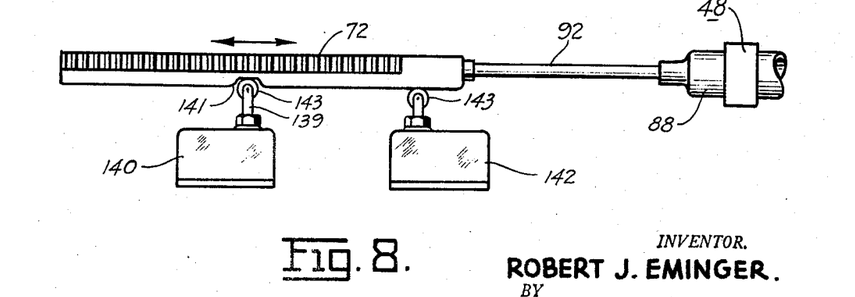
Fig. 8 is a detailed view of the rack showing one method for controlling switches according to rack position.

A winding element 28 with needle 30 has wire 31 strung therethrough; only one needle 30 being shown. In some applications there may be provided two or more needles, depending on the number of poles. Wire 31 is drawn out of the needle 30 as coils are wound onto the poles of stator 27 (Figs. 5 and 7).

Figure 5:
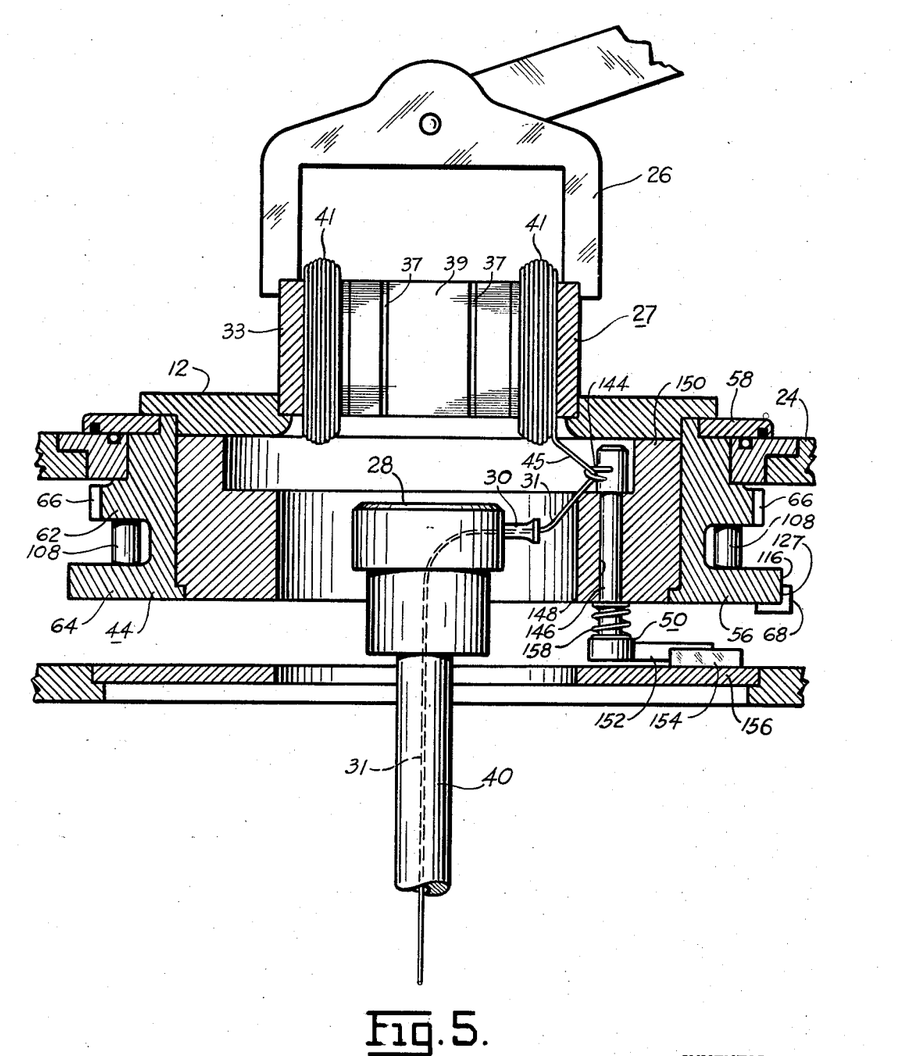
Fig. 5 is an enlarged fragmentary sectional view taken on line 5—5 in Fig. 2, the winding element and stator clamp also being shown.

One reel of wire 34 is located on one side of the apparatus, the end of the wire is passed through dereeling eyelets 36, passed over capstan 38 to obtain the necessary tension, then pulled through a vertical tube 40 (Fig. 5) of the winding element, and finally drawn out the needle 30 for attachment with the pole of the stator (Fig. 5).

The winding element 28 vertically reciprocates and swings back and forth horizontally in a series of coordinated movements which describe a closed circular or oblong path whereby wire is formed in coils around the poles of the stator. This principle of movement is fully described in previously identified application Ser. No. 479,269.

Stator construction

Figure 10:
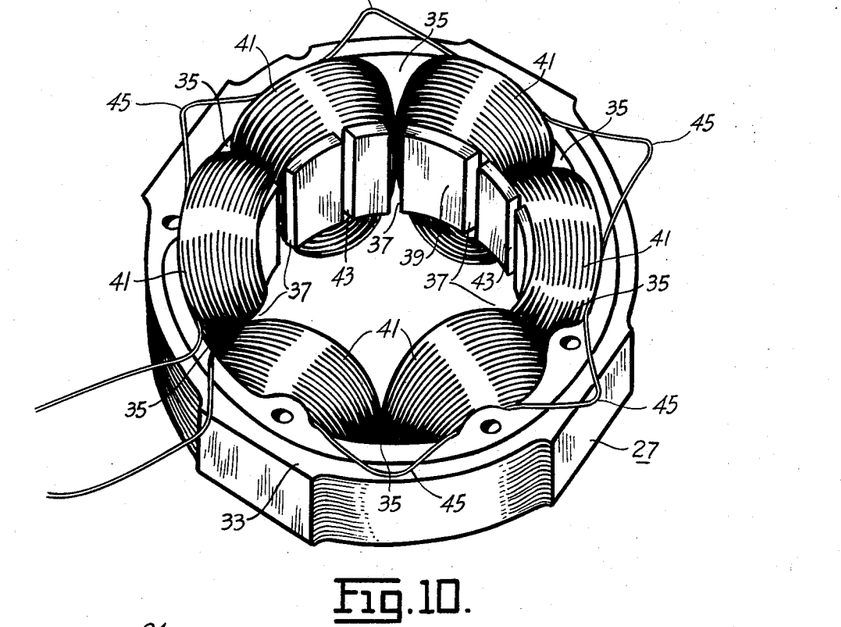

Referring to Figs. 5, 7 and 10, stator 27 comprises a laminated, metallic annulus 33, and six (6) angularly spaced slots 35. Radial gaps 37 which are formed in the inner wall 39 of the cylinder permit the winding needle to pass into the slots 35 and thus wind coils 41 of wire around poles 43 which are formed between contiguous slots 35. Coils 41 are laid one on top of the other until a preselected number is obtained which will give desired polarity strength. The direction of coil winding is reversed for adjacent poles; thus, the polarity of adjacent poles is reversed so that there are alternating north and south poles.

The wire used in winding the poles 43 is of continuous length so that the poles are wound sequentially. Connecting the coils 41 on adjacent poles are large loops or slackened lengths of wire 45. The wire is not severed when the winding operation indexes to succeeding poles. These interconnecting loops 45 can be bent back so that they easily circumvent or clear the slot 35 between adjacent poles (Fig. 10). Thus the winding needle 30 (Fig. 5) can reciprocate through each slot without catching the respective loop 45. If the loop 45 stretched across its slot 35, the needle 30 would engage the loop 45 and break the wire.

Apparatus subassemblies

The coil winding apparatus is made up of a number of subassemblies, each of which will be separately considered. The cooperation of these subassemblies will then be demonstrated from a description of the operation of the apparatus.

Figure 9:
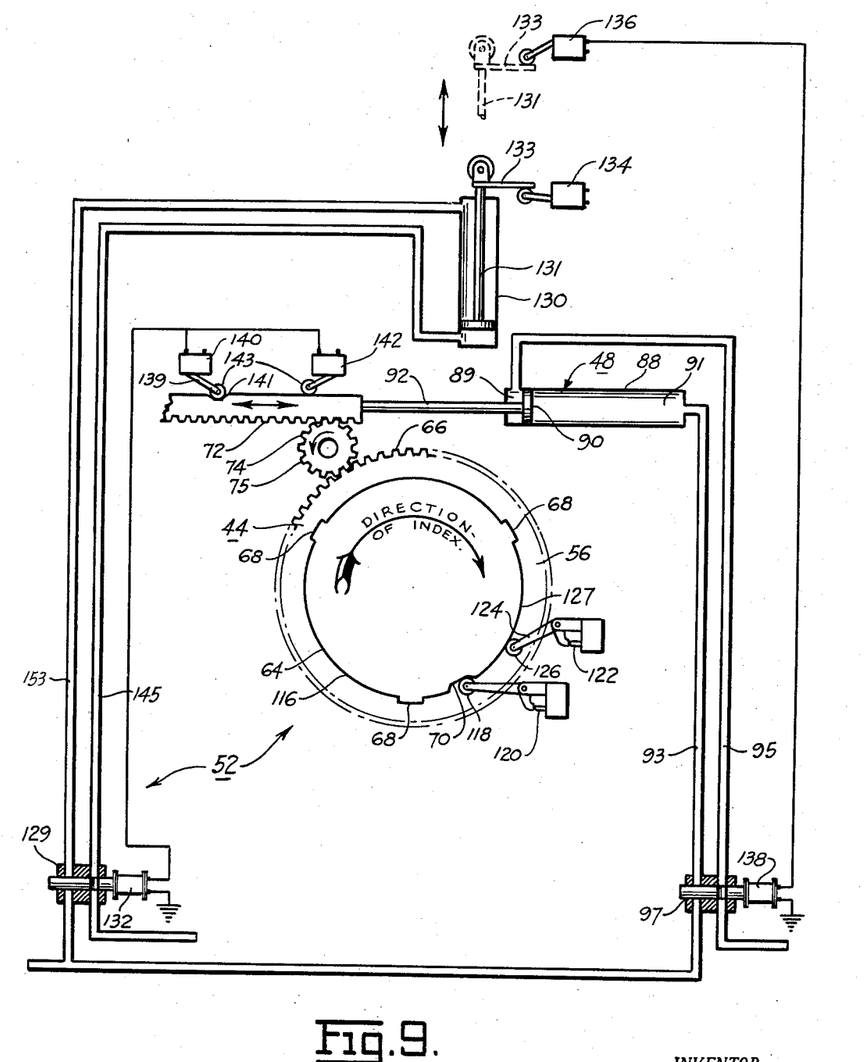
Fig. 9 is a schematic diagram showing how the various control devices in the apparatus are interconnected in order to accomplish automatic operation; and, Fig. 10 shows a completely wound six (6) pole stator.

The principal subassemblies of the apparatus are: rotary indexing assembly 44 (Figs. 2, 3 and 5); locking mechanism 46 (Figs. 4 and 4A); actuating assembly 48 (Figs. 2, 4 and 4A) for rotary indexing assembly 44; loop-pulling devices 50 (Fig. 7); and control system 52 (Fig. 9).

Rotary indexing assembly

Figure 2:
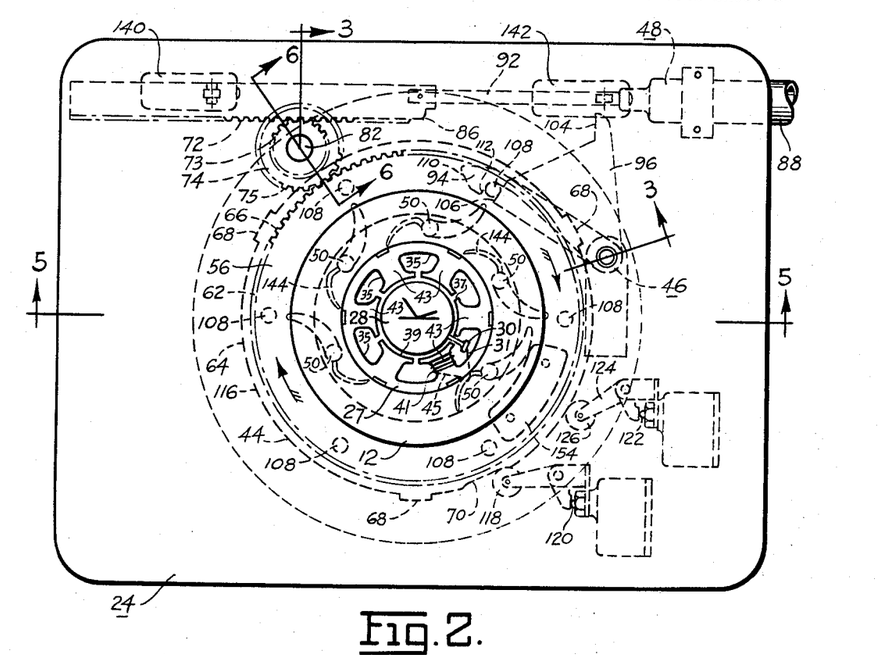
Fig. 2 is a top view of the winding apparatus with the stator clamp swung back.
Figure 3:
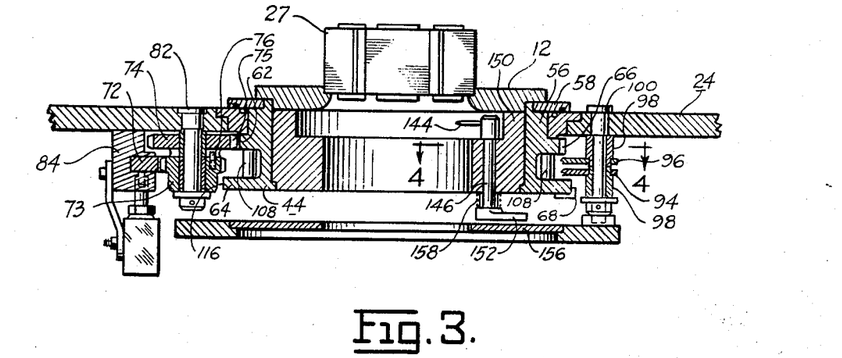
Fig. 3 is a section view taken on the line 3—3 of Fig. 2 with the locking members shown partially broken away.

With reference to Figs. 2, 3 and 5, the rotary indexing assembly 44 has for its principal component an indexing ring 56. The ring 56 is rotatably carried on supporting platform 24 (Figs. 1, 2, 3 and 5). A collar 58 is secured to the top of ring 56 in any suitable manner and provides necessary bearing support for the ring 56 on the upper surface of the platform 24.

The index ring 56 has two circular flanges, 62 and 64, (Figs. 2 and 5). Flange 62 has gear teeth 66 formed along the entire periphery thereof. The fit between flange 62 and the underside of the platform assists in maintaining the proper vertical location of the index ring, but this fit does not prevent the index ring from moving rotationally relative to platform 24. Flange 64 has two sets of circumferentially spaced cams 68 and 70 which are associated with control system 52 (Fig. 9) and will be more fully described in connection with that subassembly.

The stator 27 which is to be wound is seated on the winding nest 12 (Figs. 1 and 3) which in turn fastens to the index ring 56. The angular position of the stator 27 is determined by the index ring 56 since they are held operatively together during the entire winding process.

Actuating assembly

Referring to Figs. 2, 4, 4A, 8 and 9, the actuating assembly 48 for turning the index ring 56 includes a rack 72 and pinion 73 which operates through a ratchet gear 74, to drive the index ring 56 in one direction only (Figs. 2, 3, 6 and 9). Ratchet gear 74 has gear teeth 75 which mesh with gear teeth 66 on the index ring 56.

Figure 6:
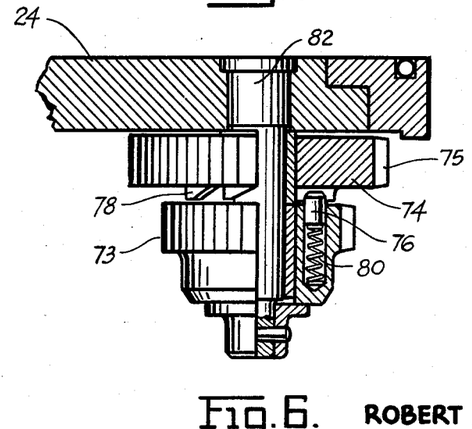
Fig. 6 is an enlarged detail view of the pinion and gear which is used to translate reciprocable movement of a rack to rotary movement of the indexing assembly, the right-hand side of the view being shown in radial section.

Between ratchet gear 74 and pinion 73 is a pawl 76 (Fig. 6) which is biased against the serrated underside 78 of the ratchet gear 74 by a spring 80 (Fig. 6). The pawl 76 locks the pinion 73 and the ratchet gear 74 together when the pinion 73 rotates counterclockwise (Fig. 2), so that the index ring 56 is then turned in clockwise direction by the ratchet gear. But when the pinion 73 is turned clockwise, the pawl 76 rides over the ratchet teeth 78 so that the index ring is not turned.

The ratchet gear 74 and pinion 73 are suspended by a vertical post 82 which is carried by the platform 24.

A rack carrier 84 (Fig. 3) is utilized for guiding reciprocatory movement of the rack 72 (Figs. 2 and 3).

An air cylinder 88 is located at one end of the rack 72. The air cylinder has two variable volume air chambers 89 and 91 (Fig. 9) separated by a piston 90. A rod 92 connects the piston 90 with rack 72. Pressure line 95 leads to air chamber 89 and pressure line 93 leads to chamber 91. A solenoids operated control valve 97 regulates flow in the respective lines.

Locking mechanism

Figure 4:
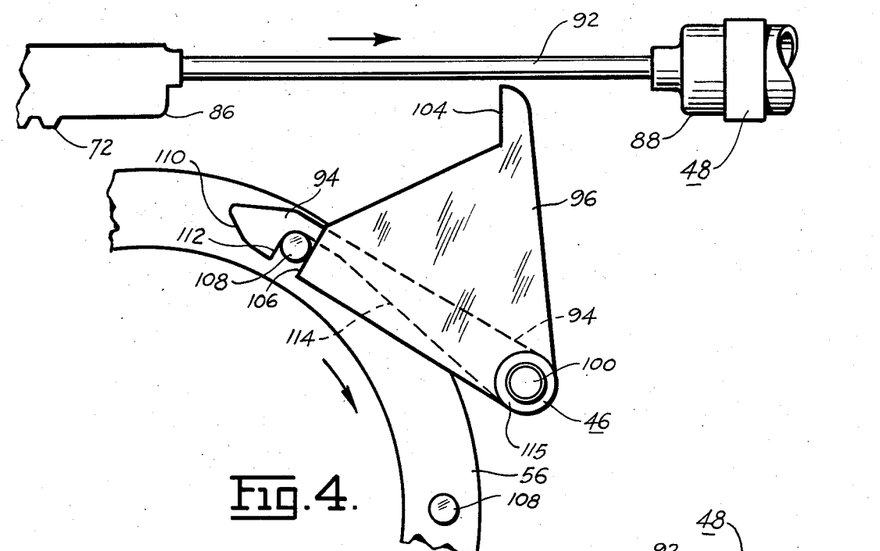
Figs. 4 and 4A, taken on lines 4—4 of Fig. 3, are detailed progressive views of the locking mechanism showing the parts in Fig. 4 as they are located when the rack starts rightward movement in a "releasing" stroke; and, in Fig. 4A, the parts are shown in the position assumed when the assembly indexes to a new angular position with the rack moving leftwardly and resuming its original position.
Figure 4A:
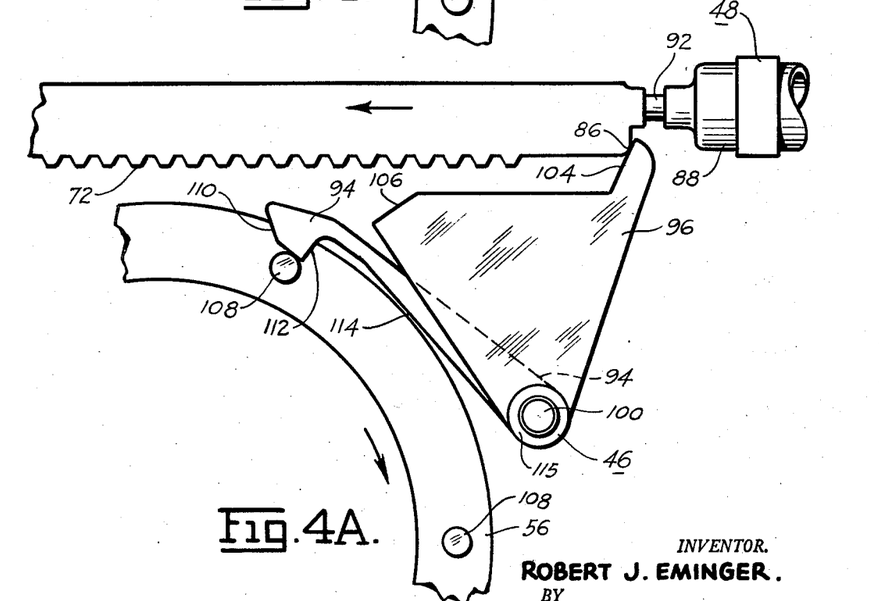

The locking mechanism 46 (Figs. 4 and 4A) is formed of two elements, a locking lever 94 and a locking cam 96 which are swingably mounted on independently movable bearings 98 (Fig. 3) which in turn are supported by the platform 24 on a vertical post 100 (Figs. 3, 4 and 4A). The locking lever 94 and locking cam 96 are spring biased to a normally "locking" position shown in Figs. 2 and 4. The springs are not shown, but a suitable arrangement may consist, for example, of helical springs fastened between these members and a part of the platform 24.

Surface 104 on one end of locking cam 96 is contacted by the rack 72 (Figs. 4 and 4A). The second end of the triangularly shaped locking cam 96 is a flattened surface 106. The flattened surface 106 of the locking cam contacts one of a series of pins 108 received in the index ring and thereby serves as an abutment, holding the index ring 56 against clockwise movement (referring to Fig. 2).

A series of cylindrical pins 108 are secured to the index ring at angularly spaced locations. The pins are transversely mounted in circular flanges 62 and 64 and are securely fastened thereto. It is the location of these pins 108 which determines the position wherein the index ring is held against rotation. The number of pins corresponds to the number of poles on the stator.

The locking lever 94 has a tapered end 110 which serves as a camming surface in conjunction with one of the pins 108. That is, as the index ring rotates and carries the pins 108 with it, the clockwise approaching pin bears against the tapered end 110 and forces the locking lever 94 and associated mounting bearing 98 to turn clockwise on the post 100 (Fig. 4A).

The locking lever 94 has a notch 112 which swings in back of the pin 108 to lock the index ring against counterclockwise movement after one of the approaching pins has advanced clockwise into engagement with surface 106 of locking cam 96. Surface 114 of the locking lever 94 is cut back diminishing in width from mounted end 115 to end 110.

In further explanation of the preceding, assuming rack 72 to be in the position illustrated in Fig. 4A, as the rack 72 begins movement in a leftward direction, locking cam 96 is out of locking engagement as shown. The continued movement of the rack 72 causes the index ring 56 to move clockwise, thereby moving the respective pin 108. When the rack has moved a short distance leftwardly, the locking cam 96 is released allowing it to swing counterclockwise and to slidingly engage the clockwise-advanced pin 108. As the rack continues its movement, the pin 108 continues clockwise until the locking cam 96 is completely returned to its position illustrated by Fig. 4. The cam surface 106 is then in position to stop the succeeding advancing pin 108.

As explained earlier, the succeeding pin 108 engages the locking lever surface 110, tripping it upwardly as shown in Fig. 4A until the pin passes to the rear of the notch 112, and at this point the lever 94 snaps behind the pin 108, thereby locking it securely against movement as shown in Fig. 4.

Control system

Some of the elements in the control system for the apparatus are directly associated with the index ring and others are directly associated with the actuating assembly. Flange 64 of the index ring has a cam surface 116 with a slight depression 70 (Figs. 2, 3, 9). A roller 118, constituting a cam follower, is arranged to ride against cam surface 116 (Figs. 5 and 9). When the roller 118 reaches the depression or recess 70, a stop switch 120 is operated which shuts off the entire apparatus. At this stage, the stator is completely wound and can be replaced with another. Since the apparatus automatically indexes to successive poles, it is apparent that the machine would continue to cycle even after the stator was completely processed if there were no provision such as switch 120 for stopping the machine. Only one of these switches is necessary to signal the end of the stator-winding operation.

As mentioned previously, the coils on succeeding poles are reversely wound so that polarity on adjacent poles alternates from north to south. The direction of winding the coils is reversed by reversing the winding motor (not shown), which actuates the winding element 28. The direction of movement of the winding motor (and hence the winding element) is controlled by a switch 122. The switch 122 is regulated by a lever 124 having a roller 126 at the end thereof (Fig. 9). Roller 126 contacts surface 127 (below surface 116, see Fig. 5) of flange 64 which is provided with a number of circumferential cams 68. Contact of the roller 126 with cams 68 on the lower portion of cam surface 116 operates switch 122 to reverse the direction of actuation of the winding element 28. The total number of cams 68 is equal to one-half the total number of poles. The cams 68 are spaced at twice the angular distance of the poles on the stator. The direction of winding motor actuation is reversed during half the total winding period, and the forward and reverse directions alternate so that the coil winding is alternately clockwise and counterclockwise. In this manner the polarity of successive poles is reversed.

The overall function of the apparatus is coordinated by a number of control means, only some of which are located in proximity to the winding elements. The description proceeds with reference to schematic diagram in Fig. 9.

When the desired number of coils are wound on the poles of the stator, the machine stops and a timer (not shown) is actuated. After a time delay, solenoid 132 is energized; control valve 129 is operated by the solenoid 132 to transmit fluid pressure to the winding head centering device via line 145. The plunger 131 moves upwardly carrying the switch bar 133, the final position being shown in dotted lines, Fig. 9. Switch 136 is actuated by the switch bar 133. Solenoid 138 is energized by switch 136 and air pressure is introduced to chamber 89 of air cylinder 88 causing the rack 72 to move toward the right.

Motor switch 140 which controls the winding head motor is operated by rack movement toward the right, so that there cannot be operation of the winding element during indexing of the machine. The switch 140 is actuated by a lever 139 having a cam follower 143 which rides against one side of the rack 72. A notch 141 receives the cam follower 143 to actuate the switch 140 and permit operation of the winding motor.

When the rack reaches its extreme rightward position, switch 142 is operated by the cam follower 143 and notch 141 to de-energize solenoid 132. De-energization of solenoid 132 operates control valve 129, which communicates pressure to the centering cylinder via line 153, causing the centering plunger 131 and switch bar 133 to return to their original positions, thus closing switch 136. The solenoid 138 is de-energized by closing switch 136 when the centering mechanism moves to its original position. The control valve 97 communicates pressure to chamber 91 via line 93 and the piston 90 moves toward the left displacing the rack therewith.

Rack movement toward the left causes the index ring 56 to rotate clockwise to a new position. When the rack is fully returned, switch 140 is actuated by the notch 141 in the rack, thereby permitting re-operation of the winding element in the direction determined by switch 122.

Loop-pulling devices

The loop-pulling devices 50 (Figs. 5 and 7) consist of a number of curved fingers 144 which are located at a vertical level intermediate the stator 27 and the final position of the winding element 28 when the stator is completely wound (Fig. 5). The number of loop-pulling devices is one less than the total number of poles. Each loop-pulling device consists of a stud 146 received through an opening 148 in carrier ring 150 (Figs. 3, 5 and 7). The curved finger 144 is press fitted or otherwise reliably secured in the end of the stud 146. The carrier ring 150 is keyed to the index ring 56 so that the wire pulling devices accompany the index ring as it indexes.

At one end of the stud 146 there is located a tappet 152, the end of which contacts a cam block 154 that is fastened to a stationary plate 156. A coil spring 158 holds the finger 144 in a normally clockwise position. The finger 144 is rotated by the associated tappet (as shown in progressive superimposed views of the device, Fig. 7) so that the wire 31 is caught between the winding element and the last wound pole (Fig. 5). Rotation of the finger 144 pulls extra wire out of the winding element 28 to form a loop 45. The loop 45 is pulled back to clear the slot 35 between the wound pole and adjacent pole, to prevent snaring of the needle 30.

Operation

A stator 27 is placed in the winding nest 12 and clamping means 26 is swung downwardly and locked over the stator to hold it firmly seated during the winding operation (see Fig. 5).

Starting button 21 is pressed (Fig. 1) and this starts the winding motor (not shown) which operates the winding element 28, causing it to describe a generally circular path. This motion of the winding element 28 produces coiling of wire about the first pole of the stator.

Referring to Figs. 5 and 7, for example, the winding head 28 starts from the position of Fig. 5 and moves needle 30 upwardly through one slot 35, 37, across the tip of one pole 43, downwardly through the adjacent slot 35, 37, and then across the bottom of said one pole 43 to complete one coil turn. The succeeding coil turns are wound on the pole by merely repeating the needle travel just described. The mechanism for moving the head 28 and needle 30 is disclosed fully in prior application Ser. No. 479,269.

When the selected number of coils have been wound on the first pole, a counter (not shown) automatically terminates the winding operation and simultaneously actuates the centering device 130, the plunger 131 and switch bar 133 moving upwardly. Concurrently with the ending of the winding operation, solenoid 132 is energized.

The centering device brings the winding element to its starting position, shown in Fig. 5 (see application Ser. No. 479,269, supra). Movement of the piston rod 131 and switch bar 133 in an upward direction is utilized to operate switch 136 (see dotted lines Fig. 9) which in turn energizes solenoid 138. The solenoid operates control 97 which then communicates pneumatic pressure to air chamber 89 via line 95, causing the piston 90 to move toward the right.

As the rack moves toward the right, switch 140 opens to prevent operation of the winding element 28 during indexing.

If reference is now made to Figs. 2, 4 and 4A, it will be noted that the rack moves toward the right, contacting locking cam 96, and causing it to swing in a clockwise direction. This movement of the locking cam 96 disengages surface 106 of the locking cam with the locked pin 108 to permit clockwise movement of the index ring 56.

During the last portion of the rightward stroke of the rack, the locking cam 96 is withheld from ring 56 through contact with the rack end.

When the rack 72 reaches its extreme rightward position, switch 142 is operated, thus de-energizing solenoid 132. Valve 129 is operated, communicating air pressure to the centering device via line 143 and causing return of the centering device to its original position. Downward movement of the piston and piston rod 131 and switch bar 133 re-operates switch 136 to de-energize solenoid 138. The solenoid 138 operates switch 97 so that pressure is transmitted to chamber 91 via line 93 where it forces the piston 90 toward the left (Fig. 9). This causes the rack to move leftwardly.

When the rack moves toward the right, the index ring remains stationary, the reason being that slippage occurs between pinion 73 and the ratchet gear 74. When the rack is moving leftwardly, however, the pinion 73 is turned counterclockwise (Figs. 2 and 9), and in this direction the pawl 76 (Fig. 6) locks with the serrated underside 78 of ratchet gear 74 and thus locks the pinion and ratchet gear together. Leftward movement of the rack 72 imparts counterclockwise movement to the ratchet gear 74 which in turn imparts clockwise movement to the index ring 56. Clockwise movement of the index ring is permitted because the locking cam is held away from the locked pin 108 until the locked pin has advanced angularly from its previous locking position (Figs. 4 and 4A).

The length of travel of the rack is computed to be sufficient to produce the necessary indexing angular movement of the stator, which for a six-pole stator, is equal to sixty degrees (60°) angular rotation. In other words, one lengthwise movement of the rack is the equivalent of one-sixth (⅙) of the circumference of the index ring. The spring-biased locking cam 96 is held with the rack during the last portion of its rightward movement. As the rack returns, however, the locking cam follows up this movement. Before the locking cam has returned to a locking position the previously locked pin 108 has advanced angularly. The returning locking cam is scheduled to assume its locking position when the next pin is moved into place. This is brought out in Figs. 2, 4 and 4A. Note the relative locking positions for the locking lever, locking cam and pin in Fig. 4A. As the rack now starts to move toward the left, the spring biased locking cam swings counterclockwise to follow up the rack movement and reassume a locking position.

When the locking cam has fully returned, the succeeding pin is now located where the previous pin was locked. The index ring is thus held from further clockwise turning in this new angular position. One further feature of indexing operation should be noted. As the index ring 56 nears completion of its angular movement, the approaching lock pin (see Fig. 4A) contacts the end 110 of the locking lever 94 and cams this member in a clockwise direction.

When the index ring 56 completes its angular movement, the spring-biased locking lever 94 turns counterclockwise so that the notch 112 snaps over the pin 108 and locks the index ring 56 against counterclockwise movement.

The rack 72 once having returned to its initial position operates switch 140 to re-actuate the winding motor for the winding element 28.

In the new angular position of the index ring 56, the cam follower 118 (Figs. 2 and 9) has moved out of recess 70 in cam surface 116. The switch 120 is thus closed so that winding of successive poles proceeds automatically until the stator is completely wound.

In this new angular position, however, it will be noted that one of the cams 68 on surface 127 of the index ring 56 has moved into contact with roller 126 to operate switch 122. Operation of switch 122 reverses the direction of the winding motor to thereby obtain a direction of coiling of the wire which is opposite that of the preceding stator pole. In this manner poles are wound so that they are alternately north and south.

One further feature in operation is the means for forming the loops 45 which interconnect adjacent pole coils. It will be remembered that the poles are wound sequentially so that there is one continuous length of wire in the circuit starting with the lead to the first pole and ending with the wire extending from the sixth and final pole (Fig. 10).

When the first pole is wound, the machine indexes, the index ring moving clockwise (Figs. 7, 9) and carrying the loop-pulling devices 50 therewith. As the tappet 152 associated with the succeeding pole is moved angularly (Figs. 5 and 7), it contacts stationary cam block 154, rotating the stud 146 against the resistance of spring 158. The finger 144 which is carried on the end of the stud 146 is swept around counterclockwise so that it catches the wire 31 and pulls it radially to form a loop 45 which clears the slot 35 between the wound pole and the succeeding pole (refer to Fig. 7). As the index ring movement progresses, the tappet 152 disengages from the cam block 154, and the spring 158 rotates the finger clockwise to its released position so that it disengages from the loop 45. Note the lowermost loop-pulling device shown in dot-dash lines, Fig. 7.

The loop 45 having cleared the slot 35 between the poles is now located so that the possibility of snagging by the winding needle is minimized during winding of the succeeding pole. This pulling of the interconnecting wire segment 45, back and away from the slot, has further advantage in that each slot 35 may be completely filled with wire without interference from the loop 45.

The total number of loop-pulling devices 50 is one less than the total number of poles 43, there being two leads provided between the first and final pole.

When the stator is completely wound, the index ring has returned to the position wherein slot 70 in cam surface 116 receives roller 118 to operate switch 120 which terminates machine operation.

The foot pedal 23 is next operated to alternately raise and lower the winding nest so that extra wire is pulled out of the winding element 20. The wound startor is removed from the winding nest 12 and replaced with an unwound stator. The fully wound stator 14 (Fig. 1) is placed in receiving nest 16; there remains only the operation of cutting the wire which trails from the last pole. The cutting operation may be deferred so that the wound stator 14 serves as a temporary anchor for the succeeding stator (see co-pending application Ser. No. 479,269, supra).

The winding element 28 is shown with a single winding needle 30. It is possible to provide three needles on the same winding element. In the case of the three needle-winding element, the needles are spaced one hundred twenty degrees (120°) apart and the machine indexes only once. Three poles of the stator spaced one hundred twenty degrees (120°) apart are wound in one direction, the machine indexes sixty degrees (60°) and the three adjacent poles are then wound in the opposite direction. It is apparent that the number of needles per winding element can be varied according to preference and design need.

While only a single selected embodiment of the invention has been illustrated and described, it will be apparent to those skilled in the art that numerous modifica-

What is claimed is:

1. Coil winding apparatus comprising in combination a stator-carrying member which is rotatable, a locking device for releasably locking said member successively in respective ones of a plurality of predetermined positions, coil-winding means moveable in a winding path for winding coils on stator poles when the stator is positioned on said member and said member is locked in any one of said predetermined positions, and means on said member for pulling loops of wire between adjacent coils out of the plane of said winding path as said member is moved between said successive predetermined positions.

2. In a coil-winding apparatus for winding stators having cylindrically disposed pole pieces with interiorly exposed pole faces and generally parallel slots, mounting means for carrying the stator to be wound rotatably on the longitudinal axis of the stator, actuating means operatively associated with said mounting means to locate the mounting means in successive predetermined angular positions, a locking device cooperably associated with said mounting means for releasably holding the mounting means in selected ones of said predetermined angular positions, a coil winding element which is longitudinally and rotationally displaceable within said stator to wind wire in a winding path around one of said pole pieces while the stator is locked in one rotational position, and means to index said stator successively into new positions as the poles are wound, the coil winding element dragging the wire from one slot to the next as the stator is indexed, a loop pulling device comprising a hook rotatably mounted to swing into hooking engagement with the wire during indexing and adapted to pull loops of wire out of the plane of the winding path as said stator is indexed into said successive positions.

3. In a coil-winding apparatus for winding stators having cylindrically disposed pole pieces with interiorly exposed pole faces and parallel slots, mounting means for carrying the stator to be wound rotatably on the longitudinal axis of the stator, actuating means operatively associated with said mounting means to locate the mounting means in successive predetermined angular positions, said actuating means comprising a pinion and rack moveable in two directions and adapted to move said mounting means and consequently said stator in only one of said directions, a locking device cooperably associated with said mounting means for releasably holding the mounting means in selected ones of said predetermined angular positions and released by said rack as it moves in the other of said directions, a coil winding element which is longitudinally and rotationally displaceable within said stator to wind wire in a winding path around one of said pole pieces while the stator is locked in one rotational position, and means to index said stator successively into new positions as the poles are wound, the coil winding element dragging the wire from one slot to the next as the stator is indexed, a loop pulling device comprising a hook rotatably mounted to swing into hooking engagement with the wire during indexing and adapted to pull loops of wire out of the plane of the winding path as said stator is indexed into said successive positions.

References Cited in the file of this patent

UNITED STATES PATENTS

| | | |
|---|---|---|
| 1,977,828 | Laib et al. | Oct. 23, 1934 |
| 2,594,707 | Allen | Apr. 29, 1952 |
| 2,627,379 | Moore | Feb. 3, 1953 |
| 2,640,652 | Harvey | June 2, 1953 |
| 2,770,424 | Grove | Nov. 13, 1956 |